United States Patent
Bellio

(10) Patent No.: US 10,571,192 B2
(45) Date of Patent: Feb. 25, 2020

(54) METHOD AND SYSTEM FOR CONTROLLING AND OPTIMISING A DEHUMIDIFYING AND/OR DRYING PROCESS

(71) Applicant: PIOVAN S.p.A., Santa Maria di Sala (Venice) (IT)

(72) Inventor: Enrico Bellio, Ponzano V.to (IT)

(73) Assignee: PIOVAN S.p.A., Santa Maria di Sala (IT)

( * ) Notice: Subject to any disclaimer, the term of this patent is extended or adjusted under 35 U.S.C. 154(b) by 167 days.

(21) Appl. No.: 15/532,903

(22) PCT Filed: Nov. 20, 2015

(86) PCT No.: PCT/IB2015/059008
§ 371 (c)(1),
(2) Date: Jun. 2, 2017

(87) PCT Pub. No.: WO2016/087980
PCT Pub. Date: Jun. 9, 2016

(65) Prior Publication Data
US 2018/0106545 A1    Apr. 19, 2018

(30) Foreign Application Priority Data
Dec. 2, 2014   (IT) .............................. MO2014A0350

(51) Int. Cl.
*F26B 21/06*   (2006.01)
*F26B 25/22*   (2006.01)
(Continued)

(52) U.S. Cl.
CPC ............ *F26B 25/22* (2013.01); *B29B 13/065* (2013.01); *F26B 3/06* (2013.01); *F26B 17/12* (2013.01);
(Continued)

(58) Field of Classification Search
CPC .......... F26B 21/04; F26B 21/083; F26B 3/06; F26B 3/00; F26B 21/06; F26B 25/006
(Continued)

(56) References Cited

U.S. PATENT DOCUMENTS 7,343,700 B2 * 3/2008 Zlotos ..................... F26B 17/14
                                                                34/482
8,088,885 B2 * 1/2012 Fellinger ............... B29B 13/021
                                                                528/503
(Continued)

FOREIGN PATENT DOCUMENTS

EP          2186613 A1    5/2010
WO     2010135811 A1    2/2010

OTHER PUBLICATIONS

International Search Report & Written Opinion of the International Searching Authority Application No. PCT/IB2015/059008 Completed: Mar. 9, 2016; dated Mar. 18, 2016 12 pages.

*Primary Examiner* — Gregory A Wilson
(74) *Attorney, Agent, or Firm* — Whitmyer IP Group LLC

(57) ABSTRACT

Method of controlling and optimising a plant for dehumidifying and/or drying plastic material in granular and/or micro-granular and/or powder and/or flake or similar form, wherein the plant includes a process fluid generator and at least one dehumidifying/drying hopper intended for supplying a respective user machine, in particular a machine for treating and transforming plastic material, including a melting device for melting the plastic material and a moulding device for moulding, in particular by injection moulding and/or blow moulding and/or compression moulding, the plastic material. The method includes the steps of detecting a process parameter of the plastic material and adjusting at least one further process parameter of the plant on the basis of the detected value of the process parameter. The detected
(Continued)

process parameter is the intrinsic viscosity of the plastic material in melted state.

27 Claims, 3 Drawing Sheets

(51) Int. Cl.
*F26B 21/08* (2006.01)
*F26B 21/10* (2006.01)
*F26B 21/12* (2006.01)
*B29B 13/06* (2006.01)
*F26B 3/06* (2006.01)
*F26B 17/12* (2006.01)

(52) U.S. Cl.
CPC .............. *F26B 21/06* (2013.01); *F26B 21/08* (2013.01); *F26B 21/10* (2013.01); *F26B 21/12* (2013.01); *F26B 2200/08* (2013.01); *F26B 2200/12* (2013.01)

(58) Field of Classification Search
USPC .............................. 34/80, 374, 443, 445, 482
See application file for complete search history.

(56) References Cited

U.S. PATENT DOCUMENTS

| 2006/0168843 A1 | 8/2006 | Zlotos |
| 2007/0277392 A1 | 12/2007 | Zlotos et al. |
| 2009/0218052 A1 | 9/2009 | DeBruin et al. |
| 2016/0091246 A1* | 3/2016 | Nordahl .................. F26B 3/08 34/384 |

* cited by examiner

METHOD AND SYSTEM FOR CONTROLLING AND OPTIMISING A DEHUMIDIFYING AND/OR DRYING PROCESS

CROSS-REFERENCE TO RELATED APPLICATIONS

This application is a national phase of PCT International Application No. PCT/IB2015/059008 filed Nov. 20, 2015. PCT/IB2015/059008 claims priority to IT Application No. MO2014A000350 filed Dec. 2, 2014. The entire contents of these applications are incorporated herein by reference.

TECHNICAL FIELD

The invention concerns a method and a system for controlling and optimising a dehumidifying and/or drying process.

BACKGROUND

In particular, the invention refers to a method and a system for controlling and optimising a plant for dehumidifying and/or drying plastic materials in granular and/or micro-granular and/or powder and/or flake or similar form, intended for supplying user machines, in particular machines for treating and transforming plastic materials, such as a machine for extruding and subsequently for injection moulding and/or blow moulding and/or compression moulding such plastic materials.

The dehumidifying and/or drying process for such plastic materials is very important in order to avoid that bubbles and/or cavities form in the melted plastic material due to the presence of humidity in the plastic material mass, in particular in the granular mass, which can compromise the mechanical and/or electrical and/or chemical-physical and/or optical properties of the final product.

Moreover, not properly dehumidifying and/or drying such plastic materials permanently deteriorates the mechanical and chemical-physical properties of the plastic materials, which, for example in a following injection or extrusion moulding process, causes an increase of the power consumption.

Therefore, a particularly efficient dehumidifying and/or drying process for the plastic materials before they are melted and subsequently moulded, allows obtaining a moulded final product substantially without defects and reducing the power consumption of the user machines to a minimum.

SUMMARY

Dehumidifying and/or drying plants are known for plastic materials, in particular in granular form, including a process fluid generator, usually air, and at least one dehumidifying/drying hopper intended to contain the plastic material in granular form and to supply a respective user machine.

The process fluid generator, also called "dryer", takes care of dehumidifying, heating and entering a defined flow rate of process fluid into the at least one dehumidifying/drying hopper.

A drawback of the known dehumidifying and/or drying plants is that they do not allow real time guaranteeing and controlling the final product quality, in other words they are not able to real time modify the dehumidifying/drying process conditions, as a function of defects being found in the final product.

Currently, in case a defect in the final product is detected at the end of the process, there are two possibilities:
- to process all the material still present in the hopper, surely discarding the final products obtained from that material; or
- to stop the production and wait for the dehumidifying and/or drying plant to change the process conditions, highly increasing the costs bound to the production stop.

An object of the present invention is to improve the methods and systems for controlling and optimising a plant for dehumidifying and/or drying plastic materials in granular and/or micro-granular and/or powder and/or flake or similar form, which is intended to supply user machines, in particular machines for treating and transforming plastic materials, such as machines for extruding and subsequently for injection moulding and/or blow moulding and/or compression moulding such plastic materials.

A further object is to provide a method and a system for controlling and optimising a plant for dehumidifying and/or drying plastic materials, which allow real time guaranteeing and controlling the final product quality and reducing the power consumption of the user machines to a minimum.

These and other objects are achieved by a method and a system for controlling and optimising a plant for dehumidifying and/or drying plastic materials according to one or more of the attached claims.

BRIEF DESCRIPTION OF THE DRAWINGS

The invention will be better understood and implemented with reference to the attached drawings showing some exemplary and non-limiting embodiments thereof, wherein.

DETAILED DESCRIPTION

The present invention is applied to a method and a system for controlling and optimising a plant for dehumidifying and/or drying polyethylene terephthalate (PET) which is intended to supply a user machine configured to produce, by blowing, container preforms, in particular bottles preforms. The following explanation will explicitly refer to that application without losing generality for this reason.

Figure 1:
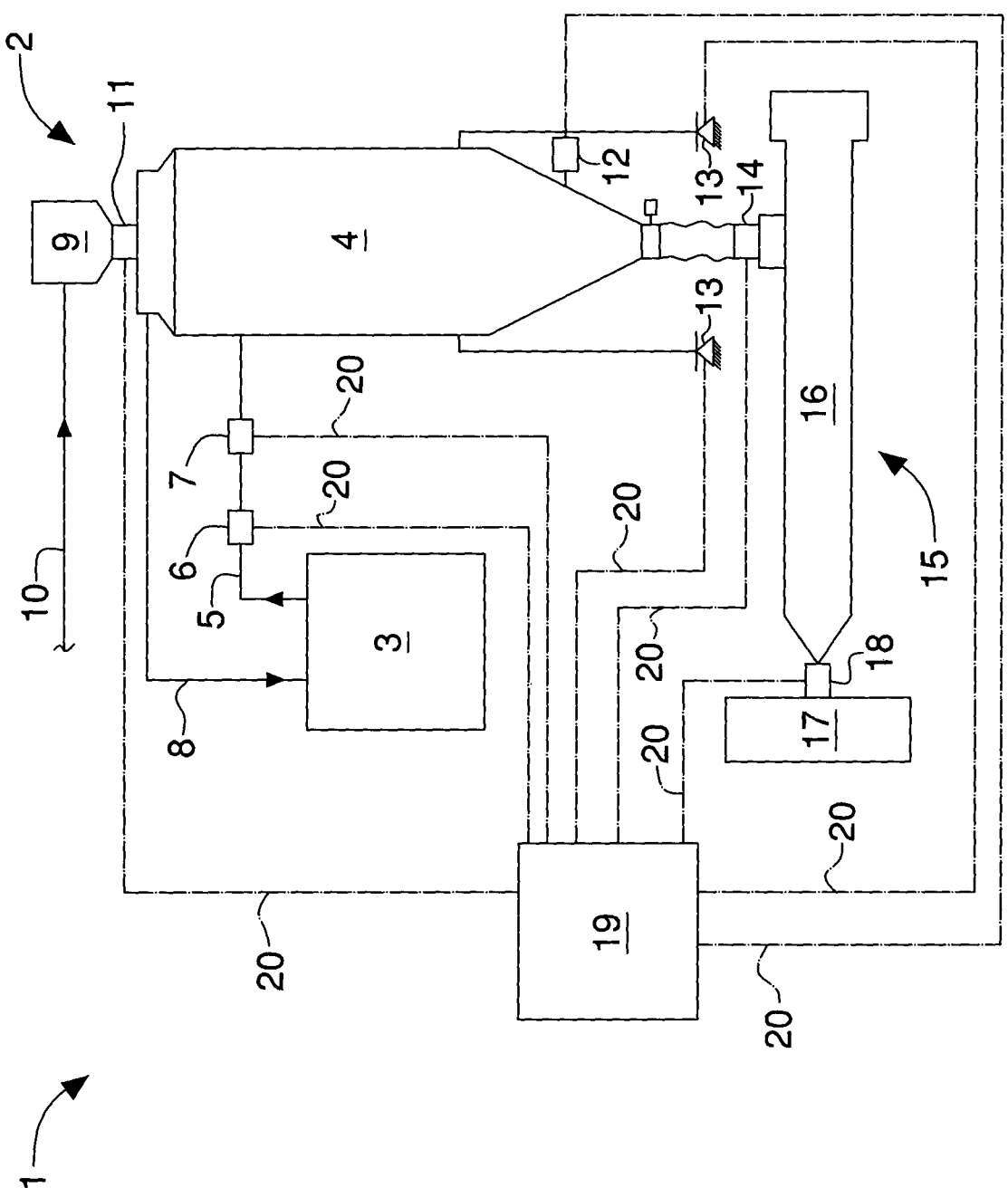
FIG. 1 is a schematic view of a controlling and optimising system of a plant for dehumidifying and/or drying plastic materials according to the invention.

Referring to FIG. 1, there is shown a system 1 for controlling and optimising a plant 2 for dehumidifying and/or drying a plastic material in granular and/or micro-granular and/or powder and/or flake or similar form, in particular polyethylene terephthalate (PET).

The plant includes a generator 3 of process fluid, in particular air, and at least one dehumidifying/drying hopper 4.

The generator 3, also called "dryer", takes care of dehumidifying, heating and entering a set flow rate of the process fluid in the hopper 4 through a first duct 5.

The system 1 includes, along the first duct 5, a measurement device 6 for measuring the process fluid dew point value ($D_p$), and a measurement device 7 for measuring the process fluid flow rate.

Through a second duct 8, the generator 3 receives the process fluid being used by the hopper 4.

The hopper 4 is supplied with plastic material by a plastic material receiver 9, the plastic material being provided to the receiver 9 through a supplying duct 10.

The system 1 includes, between the receiver 9 and the hopper 4, a measurement device 11 for measuring the humidity ($U_{IR}$) of the plastic material entering the hopper 4. Moreover, the system 1 includes a measurement device 12 for measuring the temperature ($T_C$) of the cone of the hopper 4, a pair of measurement devices 13 for measuring the hourly production of the hopper 4 and a measurement device 14 for measuring the residual humidity ($U_R$) of the plastic material exiting the hopper 4.

The ratio between the process fluid flow rate and the hourly production of the hopper 4, is defined, in the art, as K factor.

The hopper 4 is intended to supply the plastic material to a user machine 15, for example a machine for treating and transforming the plastic material, such as a machine for extruding, and subsequently for injection moulding and/or blow moulding and/or compression moulding the plastic material.

In particular, the user machine 15 includes a melting device 16, or extruder, for melting the plastic material, a moulding device 17 for moulding, in particular blow moulding, a plastic material preform, and a blowing device, not shown, being arranged to form a container, in particular a bottle, in particular by blowing, starting from the preform.

The system 1 includes, between the melting device 16 and the moulding device 17, a measurement device 18 for measuring the viscosity, in particular the intrinsic viscosity (iv), of the plastic material in melted state.

In the present description, by intrinsic viscosity (iv) it is meant the measurement of the solute contribution to the viscosity iv of a solution and it is measured in $$\frac{dl}{g}.$$

Analytically, it is defined by the following equation:

$$[iv] = \lim_{f \to 0} \left( \frac{iv - v}{vf} \right)$$

wherein "v" is the viscosity without solute and "f" is the solute volumetric fraction in the solution.

The Mark-Houwink equation defines the relationship between the intrinsic viscosity (iv) and the molecular weight M, that is:

$$(iv) = HM^a$$

with "H" and "a" being parameters depending on the polymer-solvent system. For example, the polyethylene terephthalate suitable for the containers production has an intrinsic viscosity $$(iv) = 0.78 / 0.90 \frac{dl}{g}.$$

In other words, the intrinsic viscosity (iv) is the measurement of the relative viscosity increase of a solvent when a certain polymer quantity has been dissolved in it, in standard condition, divided by the solution concentration expressed in $$\frac{g}{100 \text{ ml}}.$$

Typically, this operation is performed when the starting material is in a granular form or is re-ground, that is when a preform is reduced in granular form. In this condition, the solid material must be reduced in powder by means of a special nitrogen-cooled granulator in order not to alter the material chemical/mechanical characteristics by the mechanical action of the grinding.

On the other hand, in the system 1 according to the invention, the measurement device 18 being used to measure the intrinsic viscosity (iv) is configured to avoid that the material has to be treated with solvents, and it is able to carry out a dynamical, i.e. continuous, measurement of the intrinsic viscosity (iv).

In particular, the measurement device 18 being used is available on the market and it measures continuously a pressure difference of the material in melted state, and on the basis of such pressure difference it calculates the intrinsic viscosity value (iv).

The measurement device 18 works as follows: it extracts a small material flow in melted state from the melting device 16 and makes it pass through a two ways adapter towards a first pump and from here, through a nozzle, towards a second pump before the material in melted state goes back, through the two ways adapter, to the melting device 16 and from the latter to the moulding device 17. The measurement device 18, between the first pump and the nozzle, is provided with a first sensor to measure a first pressure of the material in melted state, and, between the nozzle and the second pump, with a second sensor to measure a second pressure of the material in melted state.

Moreover, the system 1 includes a control and management unit 19 being connected through respective communication lines 20 to the measurement devices 6, 7, 11-14 and 18.

In operation, as it will be better clarified in the following description of the operation method, the control and management unit 19 receives a signal corresponding to the detected intrinsic viscosity value (iv), verifies if the detected intrinsic viscosity value (iv) is between pre-set minimum ($iv_{min}$) and maximum ($iv_{max}$) values of the intrinsic viscosity, and sends proper control signals to the process fluid generator 3 and/or to the hopper 4 in order to adjust a process parameter of the plant 2, when the detected intrinsic viscosity value (iv) is not between the above-mentioned pre-set minimum ($iv_{min}$) and maximum ($iv_{max}$) values.

Figure 2:
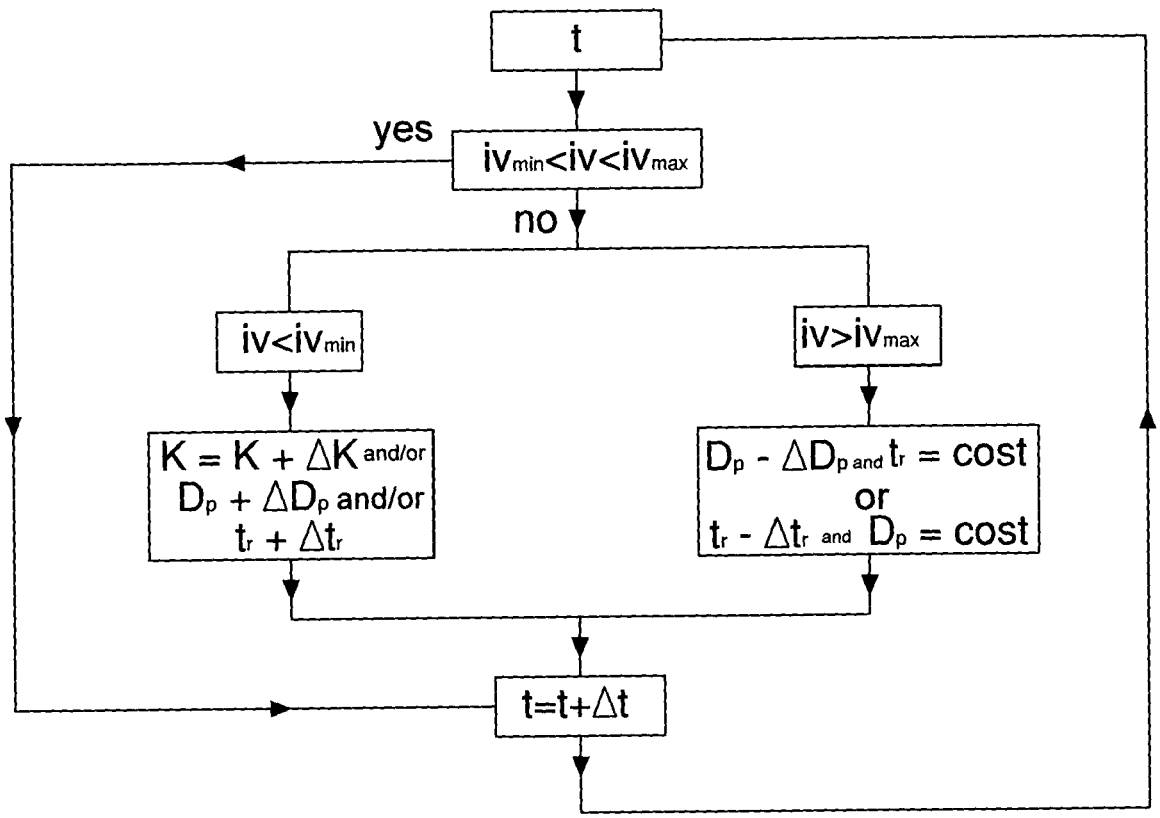
FIG. 2 is a block diagram of a first embodiment of a method for controlling and optimising a process for dehumidifying and/or drying plastic materials according to the invention.

In the following, the method according to the invention is described referring to the block diagram shown in FIG. 2.

At each time instant (t) the measurement device 18 detects the intrinsic viscosity value (iv) of the melted material.

The intrinsic viscosity (iv), being continuously measured on the melted material before it enters the moulding device 17, allows obtaining a measurement of the final product quality, in the particular case of the preform.

Controlling the intrinsic viscosity (iv) allows the system 1 to control and optimise the plant 2 in order to guarantee the final product quality.

Subsequently, the detected intrinsic viscosity value (iv) is compared, by the control and management unit 19, with the pre-set minimum ($iv_{min}$) and maximum ($iv_{max}$) values of the intrinsic viscosity to verify if it is between such values.

If the detected intrinsic viscosity value (iv) is between the pre-set minimum ($iv_{min}$) and maximum ($iv_{max}$) values, it means that the intrinsic viscosity (iv) is stable, which allows saying that the final product will satisfy the required quality standards.

Thereafter, the intrinsic viscosity value (iv) will be detected again in a following time instant (t+Δt).

Vice versa, if the detected intrinsic viscosity value (iv) is not between the pre-set minimum ($iv_{min}$) and maximum ($iv_{max}$) values, it means that the intrinsic viscosity (iv) is not stable, which leads to a reduction of the mechanical and/or chemical/physical characteristics of the final product.

In particular, if the detected intrinsic viscosity value (iv) is less than the minimum value ($iv_{min}$), it means that the intrinsic viscosity (iv) is decreasing.

A reduction of the intrinsic viscosity (iv) reveals an increase of the residual humidity ($U_R$) of the plastic material exiting the hopper 4.

This causes, during the process, a breaking of the polymer molecular chain, which can lead to the explosion of the preform during the blowing step due to the unbalance of the plastic material distribution in the stretching/blowing step.

On the user machine 15, this causes a reduction of the torque for the screw included in the melting device 16, which must be followed by an increase of the counterpressure.

More specifically, it is necessary to reduce the pressure and/or the screw turns in order to be able to reduce the injection velocity and keep the same injection time i.e. the same flow rate. In the blowing device, placed downstream of the moulding device 17, it appears a power reduction of the infrared lamps, or of the preform preheating system, in addition to a light decrease of the blowing pressure that reduces the mechanical characteristics of the obtained bottle, with loss of shape, ribs stretching, impermeability reduction and, if filled with carbon dioxide containing substances, being more disposed to "stress cracking".

If the detected intrinsic viscosity value (iv) is less than the minimum value ($iv_{min}$), then the method, through the control and management unit 19, will increase a value of the K factor, and/or of the dew point ($D_P$), and/or of a residence time ($t_r$) of the plastic material in hopper 4, in order to bring the intrinsic viscosity value (iv) back inside the desired range.

Thereafter, the intrinsic viscosity value (iv) will be detected again in a following time instant (t+Δt).

In an embodiment, first actions will be taken on the K factor and later (if needed) on the dew point ($D_P$) and on the residence time ($t_r$).

Vice versa, if the detected intrinsic viscosity value (iv) is greater than the maximum value ($iv_{max}$), it means that the intrinsic viscosity (iv) is increasing. An increase of the intrinsic viscosity (iv) reveals, for example, an over-dehumidification, or, in jargon, "re-granulation", of the PET grain.

This, during the process, causes an increase of the polymer molecular chain, which, on the user machine 15, causes an increase of the torque for the screw included in the melting device 16, which must be followed by a decrease of the counterpressure. More specifically, it is necessary to increase the pressure and/or the screw turns in order to be able to increase the injection velocity so as to keep the same injection time, i.e. the same flow rate. In the blowing device, it appears a power increase of the infrared lamps, or of the preform preheating system, in addition to a light increase of the blowing pressure.

If the detected intrinsic viscosity value (iv) is greater than the minimum value ($iv_{min}$), then the method, through the control and management unit 19, provides decreasing a dew point value ($D_P$) and keeping a residence time ($t_r$) constant or, vice versa, decreasing a residence time value ($t_r$) and keeping a dew point value ($D_P$) constant in order to bring the intrinsic viscosity value (iv) back inside the desired range.

Thereafter, the intrinsic viscosity value (iv) will be detected again in a following time instant (t+Δt).

Figure 3:
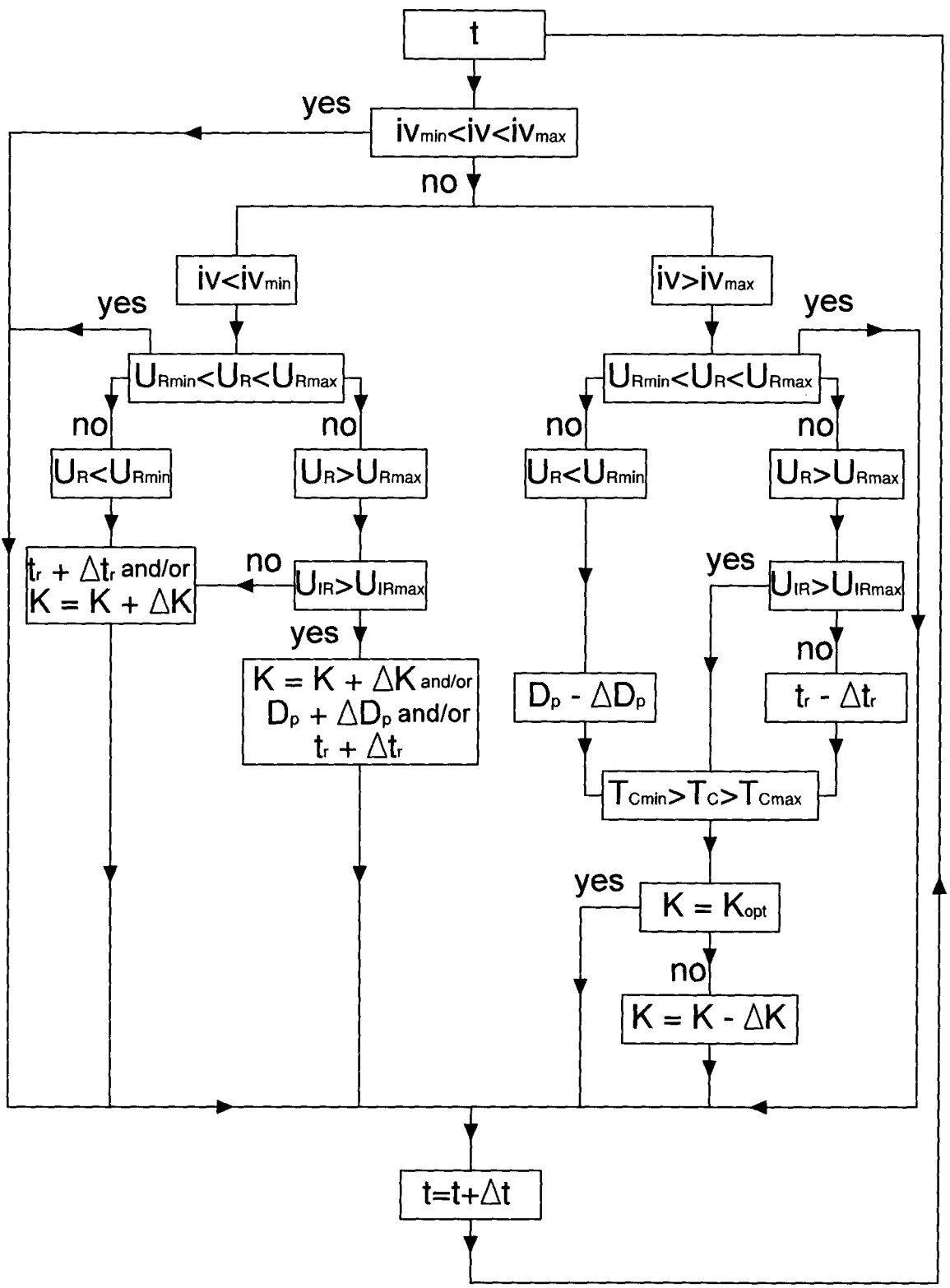
FIG. 3 is a block diagram of a second embodiment of a method for controlling and optimising a process for dehumidifying and/or drying plastic materials according to the invention.

Referring to FIG. 3 a different embodiment of the method according to the invention is shown.

Also in this embodiment, at each time instant (t) the measurement device 18 detects the intrinsic viscosity value (iv) of the melted material.

The detected intrinsic viscosity value (iv) is compared, by the control and management unit 19, with the pre-set minimum ($iv_{min}$) and maximum ($iv_{max}$) values of the intrinsic viscosity to verify if it is between such values.

If the detected intrinsic viscosity value (iv) is between the pre-set minimum ($iv_{min}$) and maximum ($iv_{max}$) values, it means that the intrinsic viscosity (iv) is stable, which allows saying that the final product will satisfy the required quality standards.

Thereafter, the intrinsic viscosity value (iv) will be detected again in a following time instant (t+Δt).

If the detected intrinsic viscosity value (iv) is less than the minimum value ($iv_{min}$), the method, through the measurement device 14, provides detecting a residual humidity value ($U_R$) of the plastic material exiting the hopper 4 and, through the control and management unit 19, verifying if the detected residual humidity value ($U_R$) is between pre-set minimum ($U_{Rmin}$) and maximum ($U_{Rmax}$) values of the residual humidity of the plastic material exiting the hopper 4.

If the detected residual humidity value ($U_R$) is between the pre-set minimum ($U_{Rmin}$) and maximum ($U_{Rmax}$) values, it means that the intrinsic viscosity (iv) is stable, which allows saying that the final product will satisfy the required quality standards.

Thereafter, the intrinsic viscosity value (iv) will be detected again in a following time instant (t+Δt).

Vice versa, if the detected residual humidity value ($U_R$) is less than the minimum value ($U_{Rmin}$), the method, through the control and management unit 19, provides increasing a value of the K factor and/or of the residence time ($t_r$) of the plastic material in hopper 4, in order to bring the intrinsic viscosity value (iv) back inside the desired range.

Thereafter, the intrinsic viscosity value (iv) will be detected again in a following time instant (t+Δt). In an embodiment, first actions will be taken on the K factor and later (if needed) on the residence time ($t_r$).

On the other hand, if the detected residual humidity value ($U_R$) is greater than the maximum value ($U_{Rmax}$), the method, through the control and management unit 19, provides verifying if a humidity value ($U_{IR}$) of the plastic material entering the hopper 4, detected through the measurement device 11, is greater than a pre-set maximum humidity value ($U_{IRmax}$) of the plastic material entering the hopper 4.

If a detected humidity value ($U_{IR}$) of the plastic material entering the hopper 4 is less than or equal to the pre-set maximum humidity value ($U_{IRmax}$), then the method, through the control and management unit 19, provides increasing a value of the K factor and/or of the residence time ($t_r$) of the plastic material in hopper 4, in order to bring the intrinsic viscosity value (iv) back inside the desired range. Thereafter, the intrinsic viscosity value (iv) will be detected again in a following time instant ($t+\Delta t$). In an embodiment, first actions will be taken on the K factor and later (if needed) on the residence time ($t_r$).

Vice versa, if a detected humidity value ($U_{IR}$) of the plastic material entering the hopper 4 is greater than the pre-set maximum humidity value ($U_{IRmax}$), the method, through the control and management unit 19, provides increasing a value of the K factor, and/or of the dew point ($D_P$), and/or of the residence time ($t_r$) of the plastic material in hopper 4, in order to bring the intrinsic viscosity value (iv) back inside the desired range. Thereafter, the intrinsic viscosity value (iv) will be detected again in a following time instant ($t+\Delta t$). In an embodiment, first actions will be taken on the K factor and later (if needed) on the residence time ($t_r$).

Vice versa, if the detected intrinsic viscosity value (iv) is greater than the maximum value ($iv_{max}$), the method, through the measurement device 14, provides detecting a residual humidity value ($U_R$) of the plastic material exiting the hopper 4 and, through the control and management unit 19, verifying if the detected residual humidity value ($U_R$) is between the pre-set minimum ($U_{Rmin}$) and maximum ($U_{Rmax}$) values of the residual humidity of the plastic material exiting the hopper 4.

If the detected residual humidity value ($U_R$) is between the pre-set minimum ($U_{Rmin}$) and maximum ($U_{Rmax}$) values, it means that the intrinsic viscosity (iv) is stable, which allows saying that the final product will satisfy the required quality standards. Thereafter, the intrinsic viscosity value (iv) will be detected again in a following time instant ($t+\Delta t$).

Vice versa, if the detected residual humidity value ($U_R$) is less than the minimum value ($U_{Rmin}$), then the method, through the control and management unit 19, provides decreasing a dew point value ($D_P$).

On the other hand, if the detected residual humidity value ($U_R$) is greater than the maximum value ($U_{Rmax}$), then the method, through the control and management unit 19, provides verifying if a humidity value ($U_{IR}$) of the plastic material entering the hopper 4, detected through the measurement device 11, is greater than a pre-set maximum humidity value ($U_{IRmax}$) of the plastic material entering the hopper 4.

If a detected humidity value ($U_{IR}$) of the plastic material entering the hopper 4 is less than or equal to the pre-set maximum humidity value ($U_{IRmax}$), then the method, through the control and management unit 19, provides decreasing a residence time value ($t_r$) of the plastic material in hopper 4.

Vice versa, if a detected humidity value ($U_{IR}$) of the plastic material entering the hopper 4 is greater than the pre-set maximum humidity value ($U_{IRmax}$), or after reducing a dew point value ($D_P$), or after reducing a residence time value ($t_r$) of the plastic material in hopper 4, the method, through the control and management unit 19, provides verifying if a cone temperature value ($T_C$) of the hopper 4, detected through the measurement device 12, is between pre-set minimum ($T_{Cmin}$) and maximum ($T_{Cmax}$) values of that temperature and if a K factor value, detected through the measurement devices 7 and 13, is equal to an optimum value $K_{opt}$ of the K factor, that optimum value $K_{opt}$ being given by the energy balance of the dehumidifying/drying process.

If the detected cone temperature value ($T_C$) of the hopper 4 is between the pre-set minimum ($T_{Cmin}$) and maximum ($T_{Cmax}$) values and if the detected K factor value is equal to an optimum value $K_{opt}$, it means that the intrinsic viscosity value (iv) has been brought back inside the desired range. Thereafter, the intrinsic viscosity value (iv) will be detected again in a following time instant ($t+\Delta t$).

On the other hand, if the detected cone temperature value ($T_C$) of the hopper 4 is between the pre-set minimum ($T_{Cmin}$) and maximum ($T_{Cmax}$) values and if the detected K factor value is different from the optimum value $K_{opt}$, the method, through the control and management unit 19, provides reducing a K factor value in order to bring the intrinsic viscosity value (iv) back inside the desired range. Thereafter, the intrinsic viscosity value (iv) will be detected again in a following time instant ($t+\Delta t$).

The values of K factor, dew point ($D_P$) and residence time ($t_r$) can be varied in a known manner.

For example, the K factor value can be varied by increasing/decreasing a flow rate of the process fluid, the dew point ($D_P$) value can be varied by increasing/decreasing the humidity content of the process fluid, and the residence time ($t_r$) value can be varied simply by increasing/decreasing the time for which the plastic material is kept in the hopper 4.

It should be noted how the method and the system 1 according to the invention allow guaranteeing and controlling the final product quality.

In fact, the continuous, i.e. in real time, monitoring of the intrinsic viscosity (iv) of the melted plastic material and (if needed) the continuous change of the process parameters (K, $D_p$, $t_r$) of the plant 2 from one side allow evaluating, at any given time, the supposed quality of the final product, and from the other side allow acting promptly in order to avoid a deviation of that quality. It is also clear how this strongly decreases the number of products to be discarded.

Also, it should be noted how such a control type, being carried out upstream from the final product, namely on the melted plastic material, allows avoiding a random check on the final product, consequently decreasing the costs bound to staff or devices being dedicated to that check.

Moreover, it should be noted how the method and system 1 according to the invention allows reducing to a minimum, i.e. optimising, the power consumption of the dehumidifying and/or drying plant 2. In fact, continuously monitoring the residual humidity ($U_R$) exiting the hopper 4, the humidity ($U_{IR}$) entering the hopper 4, the cone temperature ($T_C$) of the hopper 4, the residence time ($t_r$) in the hopper 4 and the K factor allows providing instant by instant, through the control and management unit 19, a correct and precise quantity of energy to the plastic material.

Also, it should be noted how the ability of the method and system 1 according to the invention to reach and keep an optimal condition of the treatment of the plastic material allows the user machine 15 minimizing its power consumption, in a following transformation step of the plastic material.

Moreover, it should be noted how continuously monitoring the residual humidity ($U_R$) exiting the hopper 4 and/or the humidity ($U_{IR}$) entering the hopper 4, allows better interpreting the trend of the dehumidifying/drying process. For example, at time instant (t), an increase of the residual humidity ($U_R$) exiting the hopper 4 without changes of the intrinsic viscosity (iv), suggest that the final product quality will be kept in the desired quality standards, but at the same time suggests a possible deviation of the intrinsic viscosity (iv) value. If, at the following time instant (t+Δt) the residual humidity ($U_R$) as well as the intrinsic viscosity (iv), is constant and do not tend to increase, it is possible to believe that the condition of the dehumidifying/drying process is stable.

Finally, it should be noted how the carried out tests underlined that if the dehumidifying/drying process is integrated by some quantities of the user machine 15 and therefore of the transformation process of the plastic material, being available in the managing and control system of the user machine 15, the dehumidifying and/or drying plant 2 can be further optimized. Such quantities can include, for example, the injection counterpressure and/or the screw torque and/or the screw rotational velocity of the melting device 16.

The invention claimed is:

1. A method for controlling and optimising a plant for dehumidifying or drying plastic material in granular form, micro-granular form, powder, or flake, said plant comprising a process fluid generator and at least one dehumidifying/drying hopper intended for supplying a respective user machine, said user machine comprising a melting device for melting said plastic material and a moulding device for moulding said plastic material, the method comprises the steps of:
    detecting a process parameter of said plastic material; and
    adjusting at least one further process parameter of said plant on the basis of the detected value of said process parameter;
    wherein said process parameter is the intrinsic viscosity of said plastic material in melted state.

2. The method according to claim 1, wherein said detecting and said adjusting are performed continuously.

3. The method according to claim 1, wherein said detecting is performed just before said plastic material in melted state is supplied by said melting device to said moulding device.

4. The method according to claim 1, and comprising, after said detecting, verifying if the detected value of said process parameter is comprised between pre-set minimum and maximum values of said process parameter.

5. The method according to claim 4, wherein said adjusting comprises, if said detected value of said intrinsic viscosity is less than said pre-set minimum value of said intrinsic viscosity, increasing a value of said further parameter.

6. The method according to claim 5, wherein before said increasing there is provided:
    detecting a residual humidity value of said plastic material exiting said hopper; and
    verifying if the detected value of said residual humidity of said plastic material exiting said hopper is comprised between pre-set minimum and maximum values of said residual humidity of said plastic material exiting said hopper.

7. The method according to claim 6, wherein after said verifying there is provided, if said detected value of said residual humidity of said plastic material exiting said hopper is less than said pre-set minimum value of said residual humidity of said plastic material exiting said hopper, increasing a residence time value of said plastic material in said hopper or a value of the ratio between the process fluid flow rate in the hopper and the hourly production of said hopper.

8. The method according to claim 6, wherein after said verifying there is provided, if said detected value of said residual humidity of said plastic material exiting said hopper is less than said pre-set minimum value of said residual humidity of said plastic material exiting said hopper, increasing a residence time value of said plastic material in said hopper and a value of the ratio between the process fluid flow rate in the hopper and the hourly production of said hopper.

9. The method according to claim 6, wherein after said verifying there is provided, if said detected value of said residual humidity of said plastic material exiting said hopper is greater than said pre-set maximum value of said residual humidity of said plastic material exiting said hopper, still verifying if a detected humidity value of said plastic material entering said hopper is greater than a pre-set maximum humidity value of said plastic material entering said hopper.

10. The method according to claim 9, wherein after said still verifying there is provided, if said detected value of said humidity of said plastic material entering said hopper is greater than said pre-set maximum value of said humidity of said plastic material entering said hopper, increasing a value of the ratio between the process fluid flow rate into the hopper and the hourly production of said hopper, increasing a value of the dew point of said process fluid, and increasing a residence time value of said plastic material in said hopper.

11. The method according to claim 9, wherein after said still verifying there is provided, if said detected value of said humidity of said plastic material entering said hopper is greater than said pre-set maximum value of said humidity of said plastic material entering said hopper, increasing a value of the ratio between the process fluid flow rate into the hopper and the hourly production of said hopper, increasing a value of the dew point of said process fluid, or increasing a residence time value of said plastic material in said hopper.

12. The method according to claim 9, wherein after said still verifying there is provided, if said detected value of said humidity of said plastic material entering said hopper is greater than said pre-set maximum value of said humidity of said plastic material entering said hopper, increasing a value of the ratio between the process fluid flow rate into the hopper and the hourly production of said hopper and increasing either a value of the dew point of said process fluid or a residence time value of said plastic material in said hopper.

13. The method according to claim 9, wherein after said still verifying there is provided, if said detected value of said humidity of said plastic material entering said hopper is greater than said pre-set maximum value of said humidity of said plastic material entering said hopper, increasing a value of the dew point of said process fluid and increasing a residence time value of said plastic material in said hopper.

14. The method according to claim 9, wherein after said still verifying there is provided, if said detected value of said humidity of said plastic material entering said hopper is less than or the same as said pre-set maximum value of said humidity of said plastic material entering said hopper, increasing a residence time value of said plastic material in said hopper or a value of the ratio between the process fluid flow rate into the hopper and the hourly production of said hopper.

15. The method according to claim 9, wherein after said still verifying there is provided, if said detected value of said humidity of said plastic material entering said hopper is less than or the same as said pre-set maximum value of said humidity of said plastic material entering said hopper, increasing a residence time value of said plastic material in said hopper and a value of the ratio between the process fluid flow rate into the hopper and the hourly production of said hopper.

16. The method according to claim 4, wherein said adjusting comprises, if said detected value of said intrinsic viscosity is greater than said pre-set maximum value of said intrinsic viscosity, decreasing a value of the dew point of said process fluid and maintaining constant a residence time value, or decreasing a residence time value and maintaining constant a value of the dew point of said process fluid.

17. The method according to claim 4, wherein, if said detected value of said intrinsic viscosity is greater than said pre-set maximum value of said intrinsic viscosity, there is provided:
   detecting a residual humidity value of said plastic material exiting said hopper; and
   verifying if the detected value of said residual humidity of said plastic material exiting said hopper is comprised between pre-set minimum and maximum values of said residual humidity of said plastic material exiting said hopper.

18. The method according to claim 17, wherein after said verifying there is provided, if said detected value of said residual humidity of said plastic material exiting said hopper is less than said pre-set minimum value of said residual humidity of said plastic material exiting said hopper, decreasing a value of the dew point.

19. The method according to claim 17, wherein after said verifying there is provided, if said detected value of said residual humidity of said plastic material exiting said hopper is greater than said pre-set maximum value of said residual humidity of said plastic material exiting said hopper, still verifying if a detected humidity value of said plastic material entering said hopper is greater than a pre-set maximum value of humidity of said plastic material entering said hopper.

20. The method according to claim 19, wherein after said still verifying there is provided, if said detected value of said humidity of said plastic material entering said hopper is less than or the same as said pre-set maximum value of said humidity of said plastic material entering said hopper, decreasing said residence time.

21. The method according to claim 19, wherein said method, if said detected value of said humidity of said plastic material entering said hopper is greater than said pre-set maximum value of said humidity of said plastic material entering said hopper, or after said decreasing a value of the dew point, or after said decreasing said residence time, comprises:
   verifying if a detected temperature value measured in said hopper is comprised between pre-set minimum and maximum values of said temperature; and
   verifying if a detected value of the ratio between the process fluid flow rate into the hopper and the hourly production of said hopper is the same as an optimum value of the ratio between the process fluid flow rate into the hopper and the hourly production of said hopper.

22. The method according to claim 21, wherein after said verifying there is provided, if said detected temperature value measured in said hopper is comprised between said pre-set minimum and maximum values of said temperature and if said detected value of the ratio between the process fluid flow rate into the hopper and the hourly production of said hopper is different from said optimum value of the ratio between the process fluid flow rate into the hopper and the hourly production of said hopper, decreasing said detected value of the ratio between the process fluid flow rate into the hopper and the hourly production of said hopper.

23. The method according to claim 21, wherein if said detected value of said intrinsic viscosity is comprised between said pre-set minimum and maximum values of said intrinsic viscosity, or if said detected value of said residual humidity of said plastic material exiting said hopper is comprised between said pre-set minimum and maximum values of said residual humidity of said plastic material exiting said hopper, or if said detected temperature value measured in said hopper is comprised between said pre-set minimum and maximum values of said temperature and if said detected value of the ratio between the process fluid flow rate into the hopper and the hourly production of said hopper is the same as said optimum value of the ratio between the process fluid flow rate into the hopper and the hourly production of said hopper, there is provided maintaining constant said further parameter.

24. The method according to claim 1, wherein said further parameter comprises at least one of: a value of the ratio between a process fluid flow rate in the hopper and hourly production of said hopper, a value of the dew point of said process fluid, a residence time value of said plastic material in said hopper.

25. The method according to claim 1, wherein said plastic material comprise polyethylene terephthalate.

26. A system for controlling and optimising a plant for dehumidifying or drying plastic material in granular form, micro granular form, powder, or flake, said plant comprising a process fluid generator and at least one dehumidifying/drying hopper intended for supplying a respective user machine, such as a machine for extruding, and subsequently for injection moulding or blow moulding or compression moulding, said plastic material, wherein the system comprises a measuring unit configured for detecting an intrinsic viscosity value of said plastic material in melted state and a control and management unit configured for receiving a signal corresponding to the detected value of said intrinsic viscosity, verifying if the detected value of said intrinsic viscosity is comprised between pre-set minimum and maximum values of said intrinsic viscosity, and sending control signals to said process fluid generator or to said at least one hopper to adjust, if said detected value of said intrinsic viscosity is not comprised between said pre-set minimum and maximum values, a process parameter of said plant.

27. A system for controlling and optimising a plant for dehumidifying or drying plastic material in granular form, micro granular form, powder, or flake, said plant comprising a process fluid generator and at least one dehumidifying/drying hopper intended for supplying a respective user machine, such as a machine for extruding, and subsequently for injection moulding or blow moulding or compression moulding, said plastic material, wherein the system comprises a measuring unit configured for detecting an intrinsic viscosity value of said plastic material in melted state and a control and management unit configured for receiving a signal corresponding to the detected value of said intrinsic viscosity, verifying if the detected value of said intrinsic viscosity is comprised between pre-set minimum and maximum values of said intrinsic viscosity, and sending control signals to said process fluid generator and to said at least one hopper to adjust, if said detected value of said intrinsic viscosity is not comprised between said pre-set minimum and maximum values, a process parameter of said plant.

* * * * *